United States Patent
Schaade et al.

(10) Patent No.: US 7,072,453 B2
(45) Date of Patent: Jul. 4, 2006

(54) METHOD AND SYSTEM FOR THE FLEXIBLE DEFINITION OF GRAPHIC INFORMATION ON COMMUNICATION TERMINALS

(75) Inventors: Stephan Schaade, Buchlö (DE); Gerhard Wieserner, Nürnberg (DE); Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 7 days.

(21) Appl. No.: 10/504,225

(22) PCT Filed: Feb. 3, 2003

(86) PCT No.: PCT/DE03/00300

§ 371 (c)(1),
(2), (4) Date: Aug. 10, 2004

(87) PCT Pub. No.: WO03/069876

PCT Pub. Date: Aug. 21, 2003

(65) Prior Publication Data

US 2005/0220284 A1     Oct. 6, 2005

(30) Foreign Application Priority Data

Feb. 11, 2002   (DE)   ................. 102 05 576

(51) Int. Cl.
*H04M 11/00*   (2006.01)
(52) U.S. Cl. ................. 379/93.17
(58) Field of Classification Search ............ 379/93.17, 379/93.25; 455/566, 415
See application file for complete search history.

(56) References Cited

U.S. PATENT DOCUMENTS

| | | | |
|---|---|---|---|
| 5,870,156 A | | 2/1999 | Heembrock |
| 6,895,259 B1 | * | 5/2005 | Blank nee Keller et al. ..... 455/566 |
| 2002/0077121 A1 | * | 6/2002 | Ketola ................. 455/566 |
| 2003/0013483 A1 | * | 1/2003 | Ausems et al. ........... 455/566 |
| 2003/0092432 A1 | * | 5/2003 | Hwang ................. 455/415 |

FOREIGN PATENT DOCUMENTS

| | | |
|---|---|---|
| DE | 195 23 537 A1 | 1/1997 |
| EP | 0 365 200 A2 | 4/1990 |
| EP | 0 768 784 A2 | 4/1997 |
| EP | 0 831 629 A2 | 3/1998 |
| EP | 0 848 528 A2 | 6/1998 |
| EP | 0 896 491 A1 | 2/1999 |
| EP | 1 109 384 A2 | 6/2001 |

OTHER PUBLICATIONS

Jose Verhiest and Karel Van Daele, "Extended Use of Telephone Display Function", Siemens Technik Report, vol. 4, No. 13, Oct. 2001, pp. 69-70.

* cited by examiner

*Primary Examiner*—Stella Woo

(57) ABSTRACT

The invention relates to a method for the flexible definition of graphic information on a communication terminal, said communication terminal being stationary and controlled by a communication device. The data representing the graphic information is stored in the communication device and is transmitted to the stationary communication terminal. Representation of the graphic information, especially a company logo, occurs on an output unit associated with the communication terminal.

19 Claims, 1 Drawing Sheet

METHOD AND SYSTEM FOR THE FLEXIBLE DEFINITION OF GRAPHIC INFORMATION ON COMMUNICATION TERMINALS

CROSS REFERENCE TO RELATED APPLICATIONS

This application is the US National Stage of International Application No. PCT/DE03/00300, filed Feb. 3, 2003 and claims the benefit thereof. The International Application claims the benefits of German application No. 10205576.9 filed Feb. 11, 2002, both of the applications are incorporated by reference herein in their entirety.

FIELD OF INVENTION

The invention relates to a method and a system for flexible definition of graphic information on stationary communication terminals.

BACKGROUND OF INVENTION

Identifying electronic devices in the form or product or brand names, company logos etc.—expressed in simplified terms below by the term graphic information—supports identification of electronic devices with the manufacturers of these devices. Mostly this type of identifying information is printed or stamped on the housing enclosing the electronic device.

With the current market economy dynamics for marketing electronic devices, especially communication terminals, the need often arises to modify the graphic information even after delivery to a customer or to only provide this information once the device has been delivered.

In the case of areas of an organization equipped with communication terminals—for example a company, an authority or an hotel—a situation often occurs in which these communication terminals are to be provided with graphic information identifying the organization—instead of or in addition to the manufacturer's graphic information. Customer requests of this nature, to use the technologies described above for applying the graphic information can, for economic reasons, only be met if the organization orders a specific minimum number of communication terminals.

A further limitation of permanently-applied graphic information on electronic devices relates manufacturing of electronic devices by an OEM ("Original Equipment Manufacturer") for a reseller whose logo is to be applied in place of the OEM logo. With permanently applied graphic information account thus needs to be taken, in designing the housing, of the reseller to whom the finished product is to be delivered. This means a not inconsiderable logistical effort on the part of the OEM and, for the reasons given above, is only cost effective for the manufacturer if a specific minimum number of units are accepted.

U.S. Pat. No. 5,870,156 discloses a liquid crystal display which has an otherwise transparent foil with non-reflecting patterns. For backlighting of the liquid crystal display the non-reflecting patterns appear as visible graphic information—e.g. containing a company logo—within the display area of the liquid crystal display. The graphic information can no longer be changed once it has been defined on the foil and the liquid crystal display has been installed.

The technical article by Verhiest, J.; van Daele, K.: "Extended Use of Telephone Display Function", in: Siemens Technik Report, Volume 4 No. 13, October 2001, pages 69–70 discloses a method for an extended use of a telephone display. The article describes how messages—represented as pictures or text—can be distributed, especially for promotional purposes, from a network operator to a registered subscriber. These messages are displayed temporarily, e.g. during call setup and require an external service provider, for example the network operator. This network operator supplies a plurality of subscribers who have their own communication terminals in each case, i.e. can install or exchange these terminals themselves.

The method is therefore unsuitable for long-term display of a company logo for example.

With mobile communication terminals a display of a network operator with whom the mobile communication terminal is registered in the form of textual or graphical information in the display is known. The name of the company or OEM reseller is generally stamped or printed on the housing. The graphic or textual information shown in the display, the "network operator logo" is normally stored on a card in the telephone—also known by experts as the SIM (Subscriber Identity Module) card.

The published European patent specification EP 0896491 A1 discloses a method for displaying network operator logos on mobile communication terminals in which, using the information stored on a SIM card, a display type is transferred to the network operator and the latter transmits a network operator logo adapted to the relevant display.

In addition a method for displaying temporarily stored graphic information in the form of animated sequences is known from published European patent specification EP 0831629 A2.

The graphic information mentioned at the beginning of this document cannot be displayed using any of the three methods described above, since an operator or reseller does not have access to the type of the graphic information—transferred by the network operator and/or stored on the SIM card. Furthermore it is not technically practicable for a network operator to transmit graphic information for different user groups. Thus these methods, for similar reasons to those disclosed in the technical article "Extended Use of Telephone Display Function" cannot be applied.

SUMMARY OF INVENTION

The object of the invention is to provide measures which allow a flexible definition of graphic information on stationary communication terminals.

The object is achieved by the claims.

In accordance with the invention the graphic information is provided in a communication device assigned to a stationary communication terminal. The graphic information is transferred to the communication terminal assigned to the communication device at which it is output at an output unit of the communication terminal. In this case the output unit is defined in two output areas.

The first output area is used to present conventional permanently specified subscriber information, for example a display of the time of day, the date, the subscriber number and/or the name of a calling subscriber, a menu of prompts to support operation of service features (e.g. "Fixed diversion to?") etc.

The second output area—which also does not have to be separated from the first output area, but can be a part of this first area for example—is used for presenting graphic information such as a company logo for example.

The term stationary communication terminal is taken to mean a wired or wireless communication terminal controlled by a communication device (PBX).

A significant advantage of the method in accordance with the invention can be seen in the fact that a simple-to-administer measure can be used to define or modify the graphic information of all communication terminals connected to a communication device.

Advantageous developments of the invention are specified in the subclaims.

Especially advantageous is the control of many communication terminals by one central communication device. This enables graphic information to be defined with little effort.

An exemplary embodiment of the invention is explained in more detail below on the basis of the drawing.

DETAILED DESCRIPTION OF INVENTION

Figure 1:
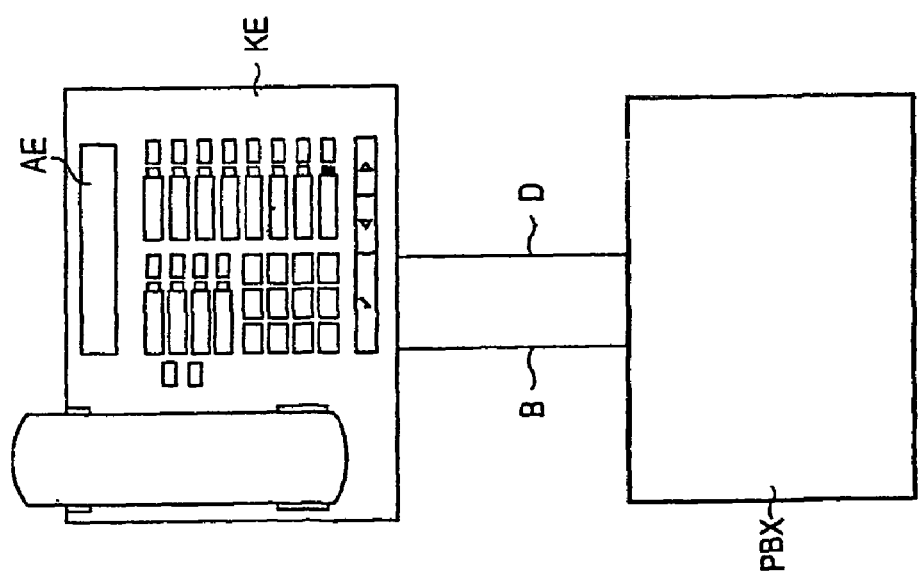
FIG. 1: a structure diagram showing schematically a definition of graphic information on a stationary communication terminal.

FIG. 1 shows a stationary communication terminal KE, i.e. one controlled by a communication device PBX and which is also wired or wireless, with an output unit AE. The communication terminal KE is connected to the controlling communication device for example via a channel D transmitting signaling information as well as via a channel B transmitting payload information. In an ISDN-based communication system these channels correspond to a B-channel or a D-channel respectively.

The output unit AE is designed to reproduce graphic content, for example as a dot matrix—such as in the form of a liquid crystal display—or also in the form of a screen.

The graphic information (not shown)—for example a company logo, which can also be displayed as an animated moving display consisting of individual sequences, is displayed on the output unit AE. For this display previously stored data representing this graphic information is transferred from the communication device to the communication terminal KE. Here for example the data is received by a central processing unit of the communication terminal KE and converted into instructions for activating the output unit AE to display the graphic Information.

For an application of the method which makes better use of the available resources the data is stored in a further embodiment in a memory unit assigned to the communication terminal KE and only replaced by modified data on an instruction from the communication device PBX. This means that there is no ongoing transmission of data for graphic information which in any event is not subject to any change over a longer period.

Alternatively the communication device PBX controls contents of the output unit AE—without a further processing unit in the communication terminal KE. This type of control—using what is known as a stimulus protocol—corresponds to that used in modern communication systems in which almost the entire computing power—sometimes also the computing power for activating and interpretation of the key events of individual operator elements—is relocated from the communication terminal KE into the communication device PBX. Control signals used for this control are exchanged on channel D which transfers the signaling information between the communication device PBX and the communication terminal KE.

The layout of the output unit AE is explained below with further reference to functional units shown in FIG. 1.

Figure 2:
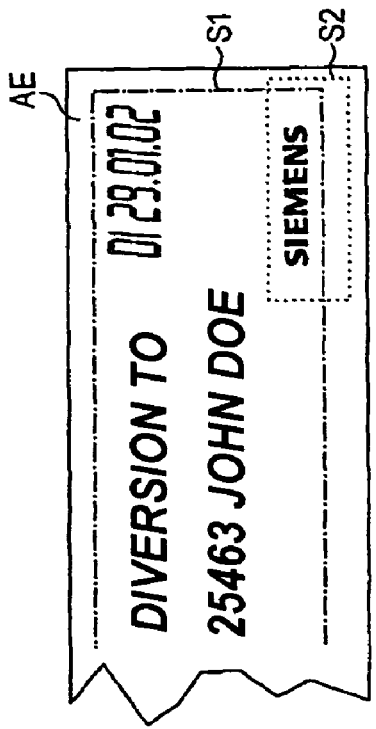
FIG. 2: a schematic diagram of two display areas of an output unit of a communication terminal.

FIG. 2 shows the output unit AE of the communication terminal KE with a first and a second display area S1, S2.

The first display area S1 shows conventional information known from modern communication devices PBX with the communication terminals KE that they control. Shown in the drawing in the first display area are for example a date display ("Tue 29.01.02") and call processing information about a diversion activated to another subscriber ("Diversion to 25463 John Doe"). The first display area S1 thus displays conventional information which—when a stimulus protocol is used for the control or communication between communication device PBX and communication terminal KE—is fixed information defined by the communication device PBX.

The second display area S2 is used to display a company logo. In the drawing the Siemens Aktiengesellschaft company logo is displayed on the output unit AE. The contents of the second display area S2 are stored in the communication device PBX and transferred centrally to all connected communication terminals KE. Preferably it is only possible for this graphic information to be changed by a technician authorized to operate the communication device PBX. Access to the contents of second display area S2 is thus blocked for a subscriber of the communication terminal KE under normal circumstances. In the drawing the output unit AE of the communication terminal KE is "idle"—shown here with a call diversion to another subscriber—that means in a call processing state in which there is currently no active telephone call. Depending on different call processing states such as for example "existing communication connection with another subscriber" with various part states such as for example "initiation of a consultation", there is provision for a display of other contents in the second display area S2.

Such a display of other contents relates especially to the case where, for a call processing state, for example an existing communication connection with another subscriber, the company logo is displayed in the second display area S2 greatly reduced or is even suppressed entirely. This measure is of advantage for example with regard to an output unit AE which is limited with respect to the overall output area, in which a prioritization of the information displayed to the operator of the communication terminal KE has to be undertaken to give precedence to the—prioritized—information of the first display area S1. This prioritization is undertaken for example by a priority control preferably arranged in the communication device PBX or also in the communication terminal KE—not shown in the diagram—as a component of the process controlling the contents of the two display areas S1, S2. This type of prioritization can also be provided for an output unit AE designed more generously with regard to the output unit AE, so as not to overload the subscriber with information. The second display area S2 can be arranged completely or partly within the first display area S1. Furthermore the restrictions on the two display areas S1, S2 are not preset. The two display areas S1, S2 are consequently to be seen in the widest sense as logical categories, i.e. as output patterns typically administered with a software process, which vary in relation to each other in size and delimitation during the execution of the software process.

What is claimed is:

1. A method for flexible definition of graphic information for a display on an output unit of a communication terminal controlled by a PBX communication device, the method comprising:
   defining a first display area on the output unit for presenting subscriber information, for which the content is fixed by the PBX communication device and/or the communication terminal;
   defining a second display area on the output unit;
   storing graphic information for the second display area in the PBX communication device, wherein the graphic information is configurable;
   transmitting the information from the PBX communication device to the communication terminal;
   displaying the graphic information in the second display area; and
   wherein access to the contents of the second display area is blocked for a subscriber of the communication terminal.

2. The method according to claim 1, wherein the communication terminal is a stationary communication terminal connected to the PBX communication device by an ISDN communications link, and digital instructions for display of the graphic information on the communication terminal are transmitted in the transmitting step from the PBX communication device to the communications terminal via an ISDN type D signaling channel.

3. The method according to claim 2, wherein the dimensions of the first and second display area overlap partly or completely and change depending on call processing states.

4. The method according to claim 2, wherein contents of the second display area are displayed in accordance with a priority control system.

5. The method according to claim 2, wherein the graphic information is buffered for the second display area in a memory unit assigned to the communication terminal.

6. The method according to claim 2, wherein the graphic information for the second display area is transmitted over a data channel carrying signaling information.

7. The method according to claim 2, wherein the graphic information for the second display area is presented as an animated sequence.

8. The method according to claim 2, wherein a number of communication terminals are controlled jointly in the same way by the communication device.

9. The method according to claim 1, wherein the dimensions of the first and second display area overlap partly or completely and change depending on call processing states.

10. The method according to claim 9, wherein contents of the second display area are displayed in accordance with a priority control system.

11. The method according to claim 9, wherein the graphic information is buffered for the second display area in a memory unit assigned to the communication terminal.

12. The method according to claim 1, wherein contents of the second display area are displayed in accordance with a priority control system.

13. The method according to claim 1, wherein the graphic information is buffered for the second display area in a memory unit assigned to the communication terminal.

14. The method according to claim 1, wherein the graphic information for the second display area is transmitted over a data channel carrying signaling information.

15. The method according to claim 1, wherein the graphic information for the second display area is presented as an animated sequence.

16. The method according to claim 1, wherein a number of communication terminals are controlled jointly in the same way by the communication device.

17. The method according to claim 1, wherein the method is performed by a computer program running on a processor unit operatively adapted to the communication device.

18. The method according to claim 1, wherein a computer program product comprises program code to perform the method.

19. A communication system for flexible definition of graphic information for an output on an output unit assigned to a communication terminal, the system comprising:
   a PBX communication device for storing the graphic information and for transmitting digital instructions for display thereof via an ISDN D signaling channel to the communication terminal;
   a first display area defined at the output unit for displaying subscriber information, for which the contents is fixed by the PBX communication device and/or the communication terminal; and
   a second display area defined at the output unit for displaying the graphic information which can be set on the PBX communication device and transferred to the communication terminal for display; and
   wherein access to the contents of the second display area is blocked for a subscriber of the communication terminal.

* * * * *